US008676611B2

(12) United States Patent
McLaughlin et al.

(10) Patent No.: US 8,676,611 B2
(45) Date of Patent: Mar. 18, 2014

(54) SYSTEM AND METHODS FOR FRAUD DETECTION/PREVENTION FOR A BENEFITS PROGRAM

(75) Inventors: Thomas J. McLaughlin, Phoenix, AZ (US); Janis E. Simm, Scottsdale, AZ (US)

(73) Assignee: Early Warning Services, LLC, Scottsdale, AZ (US)

( * ) Notice: Subject to any disclaimer, the term of this patent is extended or adjusted under 35 U.S.C. 154(b) by 0 days.

(21) Appl. No.: 13/529,028

(22) Filed: Jun. 21, 2012

(65) Prior Publication Data

US 2012/0330689 A1 Dec. 27, 2012

Related U.S. Application Data

(60) Provisional application No. 61/499,599, filed on Jun. 21, 2011.

(51) Int. Cl.
*G06Q 40/00* (2012.01)
(52) U.S. Cl.
USPC .............................................................. 705/4
(58) Field of Classification Search
USPC .............................................................. 705/4
See application file for complete search history.

(56) References Cited

U.S. PATENT DOCUMENTS

| | | | |
|---|---|---|---|
| 6,317,745 B1 | 11/2001 | Thomas et al. | |
| 6,658,393 B1 | 12/2003 | Basch et al. | |
| 7,139,734 B2 | 11/2006 | Nathans et al. | |
| 7,337,953 B2 | 3/2008 | Sgambati et al. | |
| 7,954,698 B1 * | 6/2011 | Pliha ............... | 235/379 |
| 8,099,345 B2 | 1/2012 | Stellhorn et al. | |
| 2002/0091635 A1 | 7/2002 | Dilip et al. | |
| 2003/0149646 A1 | 8/2003 | Chen et al. | |
| 2003/0187826 A1 | 10/2003 | Kennedy et al. | |
| 2004/0078323 A1 | 4/2004 | Johnston et al. | |
| 2004/0153650 A1 | 8/2004 | Hillmer | |
| 2005/0211763 A1 | 9/2005 | Sgambati et al. | |
| 2005/0289058 A1 | 12/2005 | Hoffman et al. | |
| 2006/0031239 A1 | 2/2006 | Koenig | |
| 2006/0080197 A1 | 4/2006 | Chi | |

(Continued)

OTHER PUBLICATIONS

Bagdasaryan, S. (2005). Noncompliance with welfare-to-work requirements: Examining the determinants of behavior. (Order No. 3175168, University of California, Los Angeles). ProQuest Dissertations and Theses, 171-171 p. Retrieved from http://search.proquest.com/docview/305033610?accountid=14753. (305033610).*

(Continued)

*Primary Examiner* — Muriel Tinkler
(74) *Attorney, Agent, or Firm* — Kilpatrick Townsend & Stockton LLP (57) ABSTRACT

Systems and methods of the present invention detect and/or deter individuals who may be collecting or intending to collect unemployment insurance (UI) benefits and simultaneously receive pay from an employer. Embodiments identify, during either initial screening of a UI applicant or on an ongoing basis for current recipients, those individuals who would seek to defraud UI programs by receiving improper payments. Methods include locating account information in databases from one or more (preferably, a plurality) of financial service organizations pertaining to deposit (or other) accounts for an individual applying for benefits, analyzing deposit transactions into those accounts, determining whether the individual is likely to be receiving deposits from employment or wages, and providing information to an entity such as a government agency regarding likely employment deposits for the individual.

30 Claims, 4 Drawing Sheets

(56) References Cited

U.S. PATENT DOCUMENTS

| | | |
|---|---|---|
| 2006/0191995 A1 | 8/2006 | Stewart et al. |
| 2006/0259766 A1 | 11/2006 | Rasti |
| 2007/0022008 A1 | 1/2007 | Kingsborough et al. |
| 2007/0095899 A1 | 5/2007 | Meade et al. |
| 2007/0204033 A1 | 8/2007 | Bookbinder et al. |
| 2008/0040275 A1 | 2/2008 | Paulsen et al. |
| 2008/0091593 A1 | 4/2008 | Egnatios et al. |
| 2008/0243715 A1 | 10/2008 | Stellhorn et al. |
| 2008/0288382 A1 | 11/2008 | Smith et al. |
| 2010/0185656 A1 | 7/2010 | Pollard |
| 2010/0241558 A1 | 9/2010 | Chmielewski et al. |
| 2010/0250407 A1 | 9/2010 | Silva |
| 2010/0268696 A1* | 10/2010 | Nightengale et al. ......... 707/694 |
| 2010/0332390 A1 | 12/2010 | Paintin |
| 2011/0131122 A1 | 6/2011 | Griffin et al. |
| 2011/0295739 A1 | 12/2011 | Rice et al. |
| 2012/0123942 A1 | 5/2012 | Song et al. |
| 2012/0226590 A1 | 9/2012 | Love et al. |
| 2012/0239557 A1 | 9/2012 | Weinflash et al. |

OTHER PUBLICATIONS

Anonymous. Social enterprise management. (2005). Policy & Practice, 63(1), 5-6. Retrieved from http://search.proquest.com/docview/208195212?accountid=14753.*

International Search Report and Written Opinion of PCT/US12/43380 mailed on Sep. 14, 2012, 10 pages.

* cited by examiner

FIG. 1

| ORIGINATOR NAME | ORIGINATOR ID | SEC CODE | ORIGINATOR ENTRY DESCRIPTION | EFF. DATE | TRANS. CODE | RECEIVER DFI IDENTIFICATION (RTN) | RECEIVER ACCT. NO. | AMT. | TRACE NO. |
|---|---|---|---|---|---|---|---|---|---|

SYSTEM AND METHODS FOR FRAUD DETECTION/PREVENTION FOR A BENEFITS PROGRAM

CROSS-REFERENCE TO RELATED APPLICATION

This application claims the benefit of U.S. Application No. 61/499,599 filed Jun. 21, 2011, which is hereby incorporated by reference in its entirety for all purposes.

BACKGROUND OF THE INVENTION

As government benefits programs have grown in size and cost, there is greater need to monitor those programs to assure that people receiving benefits are in fact eligible and not receiving funds through error or fraud.

As one example, in the case of unemployment insurance (UI) benefits, the number of people applying for and receiving benefits has increased significantly. In the United States, UI programs are funded jointly by the federal government and the states. The federal government has established broad guidelines for coverage and eligibility, but benefits are administered by each state, with the benefit amounts and various parameters for eligibility varying from state to state. In general, to qualify, the recipient becomes unemployed through no fault of the recipient (as referred to herein, the person applying for or receiving UI benefits or other benefits from any governmental or nongovernmental source may be generally referred to as a "UI recipient"). Once the UI recipient is re-employed, benefits are to cease.

Much of the fraud that occurs in connection with unemployment benefits arises from recipients who continue to work (through the same or different employer) or from recipients who become re-employed, without reporting the employment to the state agency administering the program.

It is often difficult to verify that a recipient is unemployed as required, since benefits are time-based. A recipient must be unemployed for each payment period for which benefits are paid. Benefits may be paid, e.g., on a weekly or bi-weekly basis, and matching re-employment to a week in which benefits have been paid can involve complex and costly audits. Further, a mere delay in reporting re-employment (by a few weeks or longer) by individual recipients can result in large cumulative annual losses (billions of dollars) to the federal and state governments, since there are millions of people receiving UI benefits at any given time.

BRIEF SUMMARY OF THE INVENTION

Embodiments of the invention provide methods and systems for detecting fraud, particularly fraud in applying for and receiving benefits under a benefits program.

In one exemplary embodiment, a method for detecting fraud includes providing a database, storing in the database account data for accounts maintained at one or more institutions, and preferably, a plurality of institutions, where the account data for each respective account comprises at least a personal identifier associated with a person for whom transactions are posted to the account. In one implementation, the person is an account holder of the account. The method further comprises receiving a request to assess risk of transactions at the account affecting the eligibility of the account holder for receiving benefits, where the request includes a submitted personal identifier, locating an account by matching the submitted personal identifier to the personal identifier stored in the database for the located account, and determining if any transactions posted to the located account affect the eligibility of the account holder for receiving benefits. In another exemplary embodiment, the method includes storing, in the database, payroll data from at least one of: a payroll processing service, a payroll data aggregator, a payroll payment provider, a military benefits administrator, a state or federal governmental taxing authority such as the Internal Revenue Service, or any other desired data source comprising income-related information. In some embodiments, eligibility may be affected by, for example, an indication in one or more accounts that the UI recipient is receiving what appears to be employment-related deposits in the accounts, or in the event of payroll-related data stored in the database, the UI recipient is receiving what appears to be a payroll payment during a period in which the UI recipient is authorized to receive UI benefits.

DETAILED DESCRIPTION OF THE INVENTION

Embodiments of the invention provide methods and system for detecting and preventing fraud and erroneous payment of benefits to program beneficiaries or recipients. In one embodiment, the benefits program is an unemployment insurance (UI) program, and methods and systems are used to detect payroll payments or other employment income that would make a UI claimant (e.g., a person applying for benefits, or a person currently receiving benefits) ineligible under the program. However, in its broadest sense, the present invention would have application in detecting improper payments made under any benefits program where income or assets might be qualifying factors, and could include any means tested programs administered by a government agency (such as programs providing Supplemental Security Income, cash welfare, Supplemental Nutrition Assistance Program (SNAP-food stamps), Housing, Disaster Services, Veteran's benefits, Earned Income Tax Credits, Medicare, and Medicaid benefits), and programs administered by a non-government organization (such as programs administered by charities, non-profits and other entities).

In described embodiments, methods and systems employ a database system that collects and stores account information from a large number of financial institutions. In various embodiments, the database may include information from only one financial institution, or from other sources such as payroll processing service, a payroll data aggregator, a payroll payment provider, a military benefits administrator, a state or federal governmental taxing authority such as the Internal Revenue Service, or any other desired data source comprising income-related information. The information relates to accounts (such as checking accounts or payroll accounts) maintained at the financial or other institutions, and includes data on transactions posted to the accounts. An agency administering unemployment benefits may query the system to locate accounts owned by or transactions accountable to a person applying for benefits, and to regularly monitor and access those accounts after benefits have been provided, to identify transactions that may indicate sources of income from employment. The system evaluates criteria, such as characteristics of the located account or the identified transactions, to provide information to the agency making the query, and such information may include any desired information such as whether or not an account match was found, whether there are detected indicia of unallowable income, and/or a risk score or other indicia. The risk score reflects the degree of risk that there are transactions associated with employment income.

The time period or "periodicity" of transactions may be evaluated. For example, UI benefits are often paid on a periodic (e.g., weekly or bi-weekly) basis, and in most cases transactions reflecting employment income are relevant only if received during the period for which unemployment is claimed. Thus, a person first applying for benefits could be screened by evaluating only transactions that would initially disqualify the applicant from receiving benefits, i.e., transactions that reflect a source of employment income that occurred after the date on which the applicant claims to be unemployed. Thus, in an initial screening of an applicant, the system might disregard transactions that were posted prior to the time period for which benefits will first be paid. As an example, in many states a person must become unemployed, and then be subject to a waiting period after applying (say, one or two weeks), before a first UI payment is made. The system in one embodiment would evaluate only transactions occurring during a period that begins with the claimed date of unemployment and continues until the end of the waiting period, and would flag only suspicious transactions for that period.

One feature of the invention is the ability to verify the continuing eligibility of a person currently receiving benefits. For such a person, the system in one embodiment might disregard any transactions falling outside a current benefit payment period, i.e., any transactions that might represent employment income that was received outside a time widow associated with a specific UI payment period. Such a time window might be the same as the time period for a single UI payment (e.g., if UI payments are made on a bi-weekly basis to an account, a query might only request evaluation of transactions posted to that or other accounts owned by the claimant during the same two week period). The system would identify any transaction reflecting income from the current UI payment (as expected) and would then also identify any other transactions posted during that same period that might be a deposit of payroll or employment income. Periodic follow-up queries could be made corresponding to each UI payment made, with the information supplied by the agency updated as appropriate (new recipients, new accounts for recipients, additional or new identifying personal information concerning recipients, etc.). In some embodiments, the time period evaluated could be for a longer or shorter period than a UI payment period, and in alternative embodiments, the query could be for a time period unrelated to any time period for which a specific UI payment is made.

In some embodiments, the system would look at transactions posted to the same account to which UI payments are posted. In other embodiments, the system would look at any account associated with the recipient, such as accounts linked to the recipient by name, by address, by social security number, or by account numbers provided by the recipient or otherwise determined to be linked to the recipient.

Various criteria can be used in evaluating a transaction. For example, for ACH transactions, certain fields of the standard ACH transaction entry include data that may indicate employment income. The name of the payor (originator), the SEC (standard entry class) code (that may reflect a recurring deposit), and the originator entry description may all be used (individually, together or in combination with other factors) to determine whether a deposit may relate to employment income. For non-ACH transactions (e.g., deposits of checks), the name of the payor (if available), the paid amount, and the payor's account might be used (e.g., comparing such information to information provided by the applicant or others regarding the names of likely prospective employers, their accounts, or past payroll amounts). For both ACH and non-ACH transactions, a recurring deposit (of the same or nearly same amount) would be a positive (but not necessarily conclusive) factor in indicating such a deposit as a possible payment for employment. For data sources obtained from a payroll aggregator or other payroll service, any desired matching fields may be utilized such as the UI recipient's name and/or social security number may be used.

In some embodiments, account history may be used in various ways to determine whether a transaction or a pattern of transactions is relevant. For example, the average total amount (or average total number) of deposits per month, during the year preceding unemployment, could be reviewed for any located account owned or used by the applicant/beneficiary. Such average could be compared to the total amount or number posted per month after the claimed date of unemployment or termination (with the expectation that the amount or number should be lower after termination). If it is not lower on an absolute basis, or lower by a predetermined amount, there may be indicated a continuing source of employment income associated with the UI recipient.

Figure 1:
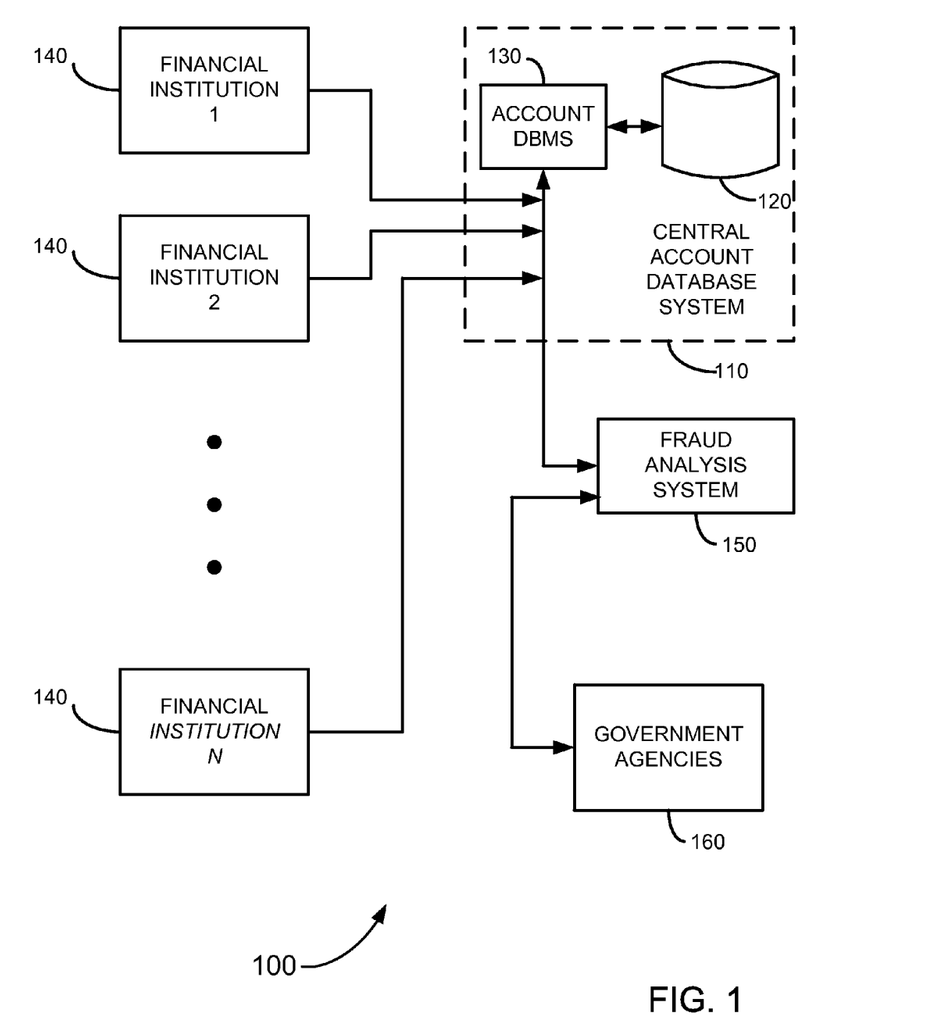
FIG. 1 is a block diagram illustrating an exemplary system for detecting improper or fraudulent UI payments.

To better understand the invention through the description of a specific implementation, reference is made to FIG. 1, which is a block diagram illustrating an exemplary system 100 for detecting improper or fraudulent UI payments according to one embodiment of the invention. As seen, the system 100 includes a central database system 110 having an account storage or database device 120 and a database management system (DBMS) 130. The database device 120 stores account and transaction information received from one or more (preferably, a plurality) of financial institutions 140 (e.g., banks, credit unions, brokerage firms, money transfer organizations, and other institutions that maintain financial and income-related accounts such as payroll processing services, payroll data aggregators, payroll payment providers, military benefits administrators, and state or federal governmental taxing authorities such as the Internal Revenue Service). The DBMS 130 manages the data in the database device 120 (e.g., stores, retrieves, arranges, sorts and processes the data in the database device).

The nature of the information provided to and stored at database system 110 will be described in greater detail later, but briefly, financial institutions 140 will provide information in the form of account numbers, applicable account owner or recipient identification information, payroll-related information and/or deposit-related transaction information (for many or all of accounts maintained at one or more of the institutions 140) and in the form of various details and characteristics of the transactions associated with each account number. It should be appreciated that such data may be provided by each financial institution on a regular and on-going basis so that it is kept current and up-to-date. A financial institution could transmit such data periodically (e.g., on a batch basis each day), to not only provide information on new accounts that may have opened since the last transmission, but to also update information on transactions posted to the accounts.

Also seen in FIG. 1 is a fraud analysis system 150 that analyzes accounts and transactions stored in database system 110, and government agencies 160 that submit queries to the fraud system 150. The fraud system 150 may be operated by the same entity that operates the database system 110, or by an independent party. The operator of either the database system 110 or the fraud system 150 could be one of the financial institutions 140 or one of the government agencies 160, but in one embodiment it is a third party that operates independently of institutions 140 and government agencies 160. In the described embodiment, the agencies 160 are various state government agencies that administer unemployment insurance (UI) benefit programs.

The operation of the fraud system 150 will be described in greater detail below, but briefly, state agencies submit queries to the fraud system 150 that indentify UI claimants (people applying for or currently receiving UI benefits). The fraud system 150 accesses the database system 110 in order to locate any accounts associated with a UI claimant, and to evaluate transactions posted to the located accounts in order to determine the risk of payroll or other employment compensation to the account holder that would make the account holder ineligible for UI benefits. In one embodiment, a response from the fraud system 150 would include both a risk score (reflecting the degree of risk that the claimant is receiving employment compensation) and a list of one or more factors or indicators that led to that risk score. In an alternative embodiment, the response could be a single indicator of whether there appears to be disqualifying income (e.g., a "yes" or "no"), or whether any accounts matching the UI recipient's identifying information were found (and optionally, information related to those accounts, such as the name of the financial institution, the number of hits, and account indentifying information).

While FIG. 1 shows the data contributed to database system 110 coming only from the financial institutions 140, as will be described later, in some embodiments the system 100 may have other sources of data (not shown) connected to and providing data to database system 110. Such other sources would permit assessment of risk of fraud that may arise from activity or circumstances other than transactions posted to accounts at the institutions 140. Also, in some embodiments, the fraud system 150 might analyze data from accounts at only one (or only a few) of the financial institutions 140, and in other embodiments there might not be a central database system 120 at all, but rather the fraud system 150 could directly access account data at databases maintained at each of the financial institutions 140.

As mentioned earlier, data to be evaluated can come from transactions representing both ACH and non-ACH transactions. ACH transactions are particularly useful in detecting employment income because ACH transaction files often provide more detail than paper check transaction/transit item files. As one example, ACH entries have standardized data fields with the name or ID of the originator (e.g., the name of the payor in a credit/deposit transaction), SEC codes, and text entry descriptions prepared and inserted by the originator.

Figure 2:
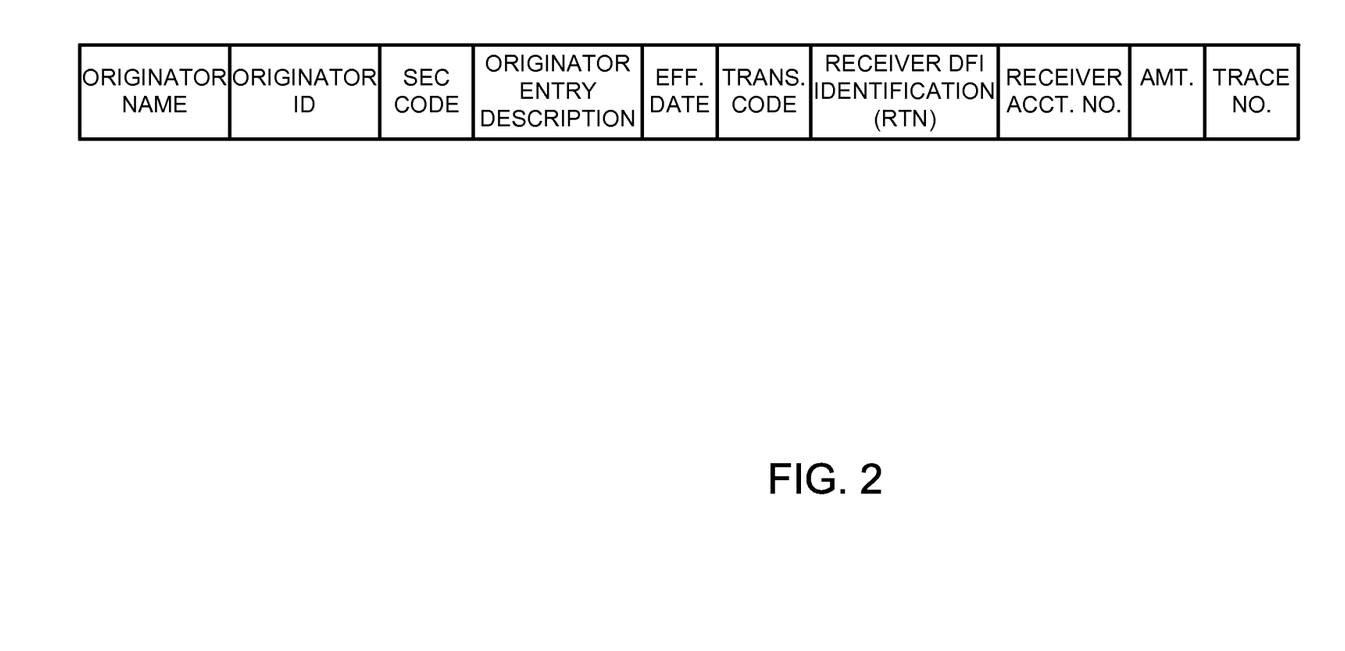
FIG. 2 illustrates fields in a typical ACH transaction entry that might be used in the system of FIG. 1 for detecting improper or fraudulent UI payments.

FIG. 2 illustrates some of the fields present in a typical ACH transaction entry/message, as sent from an originator's bank to a receiver's bank (e.g., the receiver's bank is where money may be deposited). As seen, the entry may include the name of the originator (in the case of a deposit, the payor), a unique ID associated with the originator, a standard entry class (SEC) code (identifying one of various general classes of ACH transactions that can be processed between banks), an originator entry description (typically, a few words of text chosen by the originator and describing the transaction), an effective date, a transaction code (e.g., identifying the transaction as a debit or credit), an RDFI identification (also known as the routing and transit number or RTN of the receiver's bank), the account number of the receiver/payee, the transaction amount, and a unique trace number for the transaction. Various embodiments of the present invention may use some or all of the fields to achieve a desired result. For example, the effective date field refers to the date that the originator desired a transaction to post and a settlement date field (not illustrated in FIG. 2) refers to a date upon which the transaction actually posted to the receiver's account. The differences in these date fields could be used to filter or modify the scoring or identification information, for example, if a UI recipient was paid late then a possible eligibility disqualification may be suppressed or scoring algorithm adjusted to inhibit a false hit.

As mentioned earlier, the name of the payor can be useful by comparing it to a list of likely employers. Also, among possible SEC codes is "PPD," which designates a "Prearranged Payment and Deposit Entry." Such a code is typically used for a recurring entry for a direct deposit of payroll (or recurring payments out of the account for bills), and can thus be used for identifying a recurring transaction. The "Originator Entry Description" is text entered by the originator, and it is common for employers to use certain key words such as "payroll" in such text when the transaction is an electronic deposit of a paycheck. As should be appreciated, the review of these fields (individually or together) for a specific transaction will often indicate whether the transaction is or may be employment income.

However, as also mentioned earlier, transactions other than ACH transactions may yield useful data in evaluating whether a claimant is receiving employment income. For example, data associated with the deposit of checks may include the name of the payor, the amount of the check, and the account from which it is drawn (e.g., for comparison to lists of accounts known to be used or likely to be used for payroll).

As also mentioned earlier, account history can establish patterns of transactions and deposits, and can yield data for use in evaluating recent transactions. One strong indicator of employment income is a recurring deposit, since employment income is typically periodic. The amount of net pay will often not change much or at all between pay periods, and if it does change, the change can be attributable to predictable factors, such as annual raises, changes in federal and local tax rates, changes in standard exemptions due to family/personal circumstances, predictable changes in deductions attributable to healthcare and other insurance premiums, sales incentives varying by demand or time of year, and so forth. Also, account history can be used to assess fraud risk other than risk based on locating likely deposits of employment income. For example, transactions over a period of time (and posted to multiple accounts) can evidence attempts to conceal assets (holding money in accounts not identified to the agency by the claimant), and transaction patterns of larger amounts being broken into smaller transaction amounts (over multiple accounts) can evidence money laundering. All these patterns and characteristics can be used in assessing the risk of fraud.

In addition, a person applying for unemployment may be asked to disclose (as part of the application for benefits) sources of income or deposits not attributable to employment income, and that would not disqualify that person from receiving benefits. Examples might be regular non-employment income received from savings, investments and annuities, paychecks received by other family members that might be deposited to an account jointly owned with the claimant, and expense reimbursement amounts or severance pay expected from a past employer (e.g., that might be deposited after termination). All this information can be taken into account in evaluating transactions to determine whether an individual transaction is likely to reflect disqualifying employment income.

Account history and recurring payments can be evaluated in a number of different ways. As an example, a claimant's occupation might result in paychecks of varying amounts (e.g., because the pay was wholly or partly based on commissions). Rather than relying on indicators of near constant income, account history could be considered to determine the timing or frequency of past deposits. If the claimant's account continues to show deposits of the same frequency or on or near the same days of the month as in the past for paychecks (even though varying in amount), such deposits might reflect continuing employment income. Also, as mentioned above, an amount of income over a predetermined interval of time may be computed for time periods prior to the UI recipient's application for UI benefits, and compared to determine whether there was a drop attributable to loss of employment.

As another example, if the claimant indicates severance or reimbursement deposits are expected from a past employer, then any deposits where such employer is the payor might be filtered out from consideration (unless the amount of the deposits appeared to be for the same amount as past regular paychecks). Also, in the case of an ACH transaction, the entry description for such payments might have key words such as "severance" or "travel reimbursement," and any such transaction could be filtered out.

As yet another example, certain types of payments (other than from employment) might disqualify a claimant. A person receiving welfare benefits if often disqualified from also receiving UI benefits, and so any deposits from a payor or having ACH text descriptions that indicate a welfare payment, could be flagged.

In one embodiment, the data resulting from the analysis of transactions in any account owned by a claimant is provided to a scoring model (implemented by programming within fraud analysis system 150) which uses statistical or other analysis to determine the likelihood that a deposit reflects employment income. The scoring model could use a plurality of weighting/risk factors. The actual weighting factors may differ based on fine-tuning and honing of the scoring model, and might change over time based on experience. Different agencies may assign different weights to different factors, and in some cases the agency using the risk data will choose different weights depending on its own experiences or its risk tolerance. Data is collected and then statistically reviewed to identify specific transactions or patterns of transactions which predict risk. For example, the design of the model could be based on analysis of large numbers of past transactions (involving many claimants and agencies), and the characteristics of such transactions. Based on that empirical and experiential data, predictive data can be generated as to how any given ACH transaction (or traditional paper check transaction) might predict the future risk associated with characteristics of similar deposit transactions. The predictive characteristics are identified and then built into a model. In alternative embodiments of the present invention, neural models or rules models may be used instead of statistical models.

The scoring model might yield a risk score (for example, from 1-100, with "1" indicating a very low likelihood that the claimant is receiving disqualifying income, and "100" indicating a very high likelihood that there is disqualifying income). As mentioned earlier, in a response to the agency making the query, the risk score could be accompanied by factors or the circumstances that gave rise to the risk score, such as continued recurring payments, payments from a past employer, and payments from a disqualifying source (a likely employer, a past employer, a welfare agency, and so forth). Such information is provided to the administering agency with such level of detail as may be needed to investigate and determine whether the circumstances do involve improper UI payments or fraud.

Figure 3:
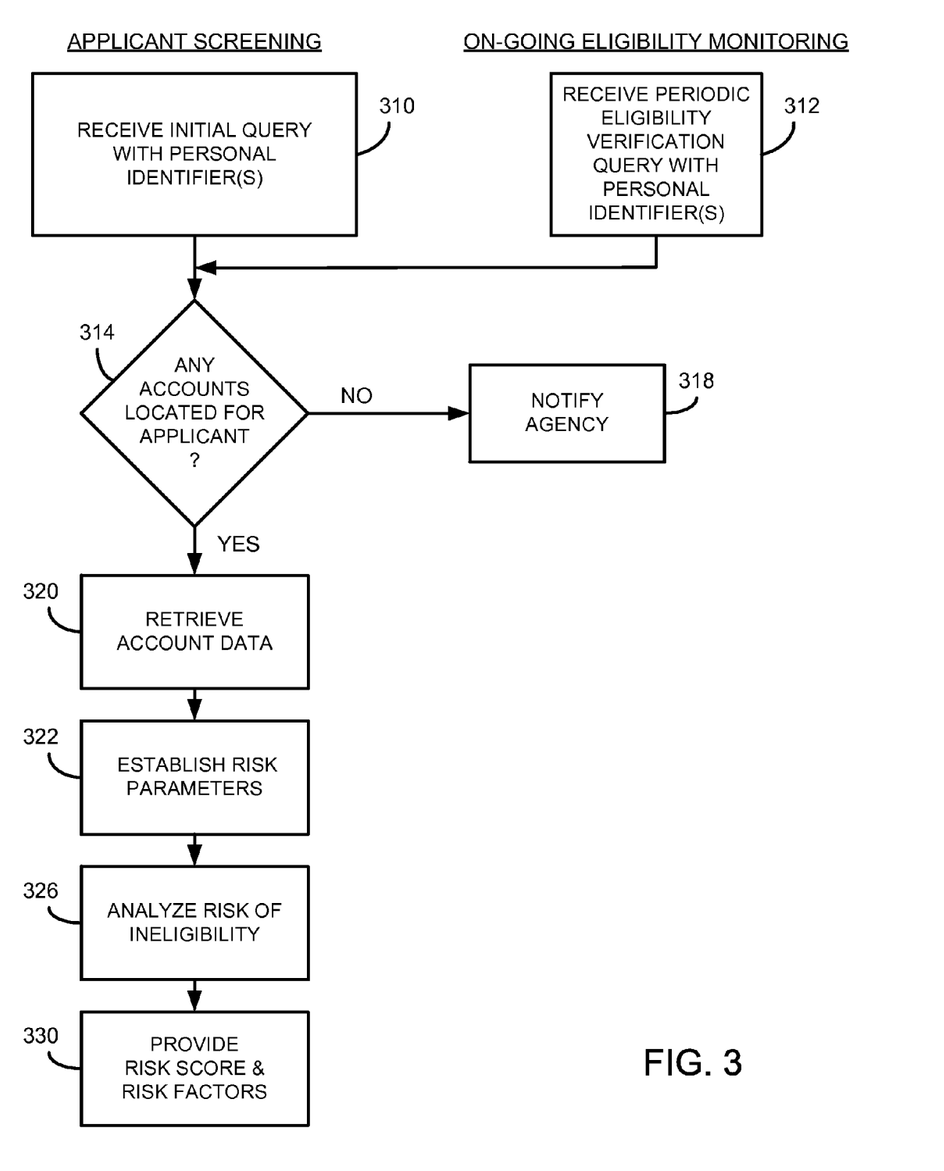
FIG. 3 is a simplified flow diagram illustrating a process implemented at the fraud analysis system of FIG. 1.

FIG. 3 is a simplified flow diagram illustrating a process implemented in the fraud analysis system 150 for assessing risk that a claimant for UI benefits is receiving disqualifying income. The process begins with a query from an agency administering UI benefits, which can either be as part of the initial screening of an applicant for benefits (block 310) or as part of on-going periodic monitoring of current UI recipients (block 312). In both cases, the overall process for assessing risk may involve the same or similar steps following the query steps 310, 312. In each case, the query received from the agency would include personal data identifying the claimant.

For example, in an initial applicant screening at step 310, the agency could send the applicant's name, address, social security number, and one or more account numbers, e.g., account numbers identifying an account into which the benefits (if approved) would be deposited, and any other accounts as identified as owned by the applicant (either alone or jointly with others). The initial query could be real-time or near-real-time, with data entered by personnel at the agency and a real-time response returned indicating (as will be described) whether there is a risk of disqualifying income. Alternatively, the query could be made in batch-mode, say at the end of each day, reflecting all applications for unemployment benefits received that day, with results returned for all those applications.

In the case of on-going verification at step 312, the agency could send personal data concerning one or more UI recipients (updated as appropriate). In one embodiment, queries at step 312 would be sent at regular intervals in batch mode with files for a group of some or all current recipients, updated to reflect any changes to information for individual recipients (such as new account numbers) and also including new recipients that have been added since the last query and deleting recipients that have been dropped since the last query (e.g., recipients that have become re-employed and that no longer receive benefits). Alternatively, the query at step 312 could be in real-time for a single, current recipient. For example, a real-time query might be sent if the eligibility of the recipient is questioned or if eligibility needs to be individually investigated (e.g., when accounts of the recipient not previously identified become known, such as being identified by the recipient or by a third party).

Using the personal data or information in the query, accounts are located at step 314. Accounts may be located by account numbers given in the query. Alternatively, the claimant's social security number, name, or address could be used to also locate accounts that might be present in database 120. In some cases, "fuzzy" matches might be noted, e.g., when a name or address is nearly the same and could be a match. For example, for a claimant with the name "John A. Smith," accounts might be located for account holders J. A. Smith or John Smith, and the system 150 would identify those accounts as possible matches. Other personal data (address, date of birth, telephone number, email address, and so forth) could be used to resolve close matches. If the match appears to be close but not identical, an account could be included in the analysis, but the risk score might be adjusted (up or down) if disqualifying income transactions are found, to reflect the degree of certainty (or uncertainly) as to whether that account is owned by the claimant. In some cases, "fuzzy" matches can help identify claimants that may have applied for benefits under several different variations of the same name.

If no accounts are located, the agency is notified at step 318. In the case of an initial screening, such a circumstance might require follow-up with the applicant to make sure correct account information was given. In some embodiments, the absence of a located account might be used to indicate risk (e.g., a perceived higher risk if the applicant appears to have provided false information). Similarly, if an applicant gives an account number into which UI payments are to be deposited, and other personal information (name, social security number, etc.) in database 120 for the located account does not match the applicant, the risk score assigned to that applicant might also be increased. In some embodiments, if step 314 identifies a large number of accounts owned by the claimant, such fact in and of itself might be a factor that would increase the risk score (fraudsters often set up and access many accounts in order to conceal fraudulent activity).

If accounts are located at step 314, then account data for those accounts are retrieved from database 120 for analysis at step 320. At step 322, account parameters are established for review of account data. The parameters could depend on the nature of the query (e.g., initial screening vs. on-going verification). The risk parameters could also depend on the amount of data available and the desires of the agency. For example, in the case of on-going verification, the time window for which the transactions are to be reviewed could be established, e.g., for only a single benefits payment period. In the case of an initial screening, the time window might be established for transactions occurring after the date of termination and the required waiting period. The parameters might also be based on the amount of analysis desired by the agency. In some cases, an agency may desire only a high-level look at the characteristics of transactions during the relevant period, and thus receives only a simple risk score based on that review. In other cases, the agency may desire a more complete analysis with a review of account history over the past year or two, and a comparison of recent transactions to historical patterns of transactions (as earlier discussed). In other cases, the agency may want data reviewed and analyzed from sources other than accounts of the claimant. For example, the agency might want to include data from databases maintained by other agencies (to determine if other, non-UI benefits are being paid), from other states (to see if UI benefits are being paid in other states), and so forth.

Further, the agency sending the query may want risk analysis done in accordance with scoring models developed or preferred by that agency, which could weigh factors, circumstances and transactions according to the past experiences of that agency in uncovering fraud, or which would require certain events to be either reviewed or excluded from review, according to local state policy.

The transactions and other account data are then analyzed in accordance with the scoring model implemented within the fraud monitoring system 150, at step 326. The result of the analysis is a risk score and, in some embodiments, risk factors or indicators giving rise to the score, which are then provided to the agency at step 330.

It should appreciated that the data provided at step 330 could depend on the amount of data available for review, the sophistication of the scoring model used, and the format of results or degree of detail desired by the agency. The following Table I illustrates a one embodiment of a simplified and high-level risk score model, with only one of four risk scores (Risk Scores 1-4) given for each claimant, based on six different combinations of various risk criteria/factors (Risk Criteria A-F).

TABLE I

| Risk Score Category | Risk Criteria A Name, SSN, ABA Routing Number, and Account Number Match | Risk Criteria B Type of Account (Individual Joint or Unknown) | Risk Criteria C UI Deposit & Payroll Deposit in the same time period to the same account | Risk Criteria D UI Deposit & Recurring other deposit in the same time period to the same account | Risk Criteria E Payroll deposit found in a separate account in the same time period with the same owner | Risk Criteria F Recurring other deposit found in a separate account in the same time period with same owner |
|---|---|---|---|---|---|---|
| 1 | Yes | Individual | Yes | No | Yes | No |
| 2 | Yes | Individual | No | Yes | No | Yes |
| 3 | Yes | Joint/Unk | Yes | No | Yes | No |
| 4 | Yes | Joint/Unk | No | Yes | No | Yes |

In this embodiment, Risk Score 1 represents the highest risk of there being disqualifying income for a claimant. In this category, the name, social security number (SSN), routing number and account number given in a query are found to match data in the database 120 (Risk Criteria A). The Type of Account (in which a relevant transaction with risk has been found) is an individual account (Risk Category B). Risk Criteria C or E also are found, i.e., either the UI deposit and payroll deposit are found in the same period in the same account (Risk Criteria C), or the payroll deposit is found in the same period in a different account (not the account where the UI deposit is made) that is owned by the claimant (Risk Criteria E).

Risk Score 2 is a lower risk than Risk Score 1, and in this category the name, social security number (SSN), routing number and account number are found to match data in the database (Risk Criteria A). The Type of Account is an individual account (Risk Category B). Risk Criteria D or F are also found, i.e., either the UI deposit and a recurring deposit are found in the same period in the same account (Risk Criteria D) or a recurring deposit is found in the same period in a different account owned by the claimant (Risk Criteria F). This risk is lower because a recurring deposit may (or may not) reflect employment income, and thus the likelihood of fraud is deemed lower in the scoring model.

Risk Score 3 is a lower risk than Risk Score 2, and the criteria found are similar to Risk Score 1, except that the type of account located is a joint account co-owned by the claimant, rather than an individual account (or the individual/joint feature is unknown). This risk is lower because a payroll deposit in a joint account may be attributable to the co-owner, and thus the likelihood of fraud is deemed lower.

Risk Score 4 is a lower risk than Risk Score 3, and the criteria found are similar to Risk Score 2, except that the type of account located is a joint account co-owned by the claimant rather than an individual account. This risk is lower because a recurring deposit in a joint account may not be employment income, and the recurring deposit may be attributable to the co-owner, and thus the likelihood of fraud is lower.

As should be understood, the forgoing is only a simple example of a risk score arrangement, and many other scoring models are possible, e.g., models involving more sophisticated analyses, more (or different) risk criteria including any of the UI recipient's identity information or parameters, and courser or finer granularity of levels of risk scores.

In some embodiments, risk can be analyzed and scored using data other than deposit transactions posted to a claimant account. In some cases, all types of transactions might be reviewed, including those reflecting expenditures or payments out of the account. As an example, transaction payments out of the account to persons or entities associated with fraud or other suspicious activity might increase the risk score. In addition, while the described embodiments primarily discuss the review of transactions posted to checking accounts (or demand deposit accounts "DDA"), many other types of accounts at the institutions 140 can be accessed in evaluating risk, such as savings accounts, debit card accounts, brokerage and investment accounts, stored value accounts, and money transfer accounts, information from payroll processing services, payroll data aggregators, payroll payment providers, military benefits administrators, state or federal governmental taxing authorities such as the Internal Revenue Service, or any other desired data source comprising income-related information. These other types of accounts may be used individually or in combination with each other and/or checking/DDA accounts.

Also, the risk data derived from evaluating transactions at accounts stored in database 120 (and based primarily on the likelihood of the claimant having employment income) can be augmented with other data to arrive at a more complete assessment of risk. For example, in addition to databases reflecting other sources of welfare benefits (as discussed earlier), the fraud system 150 may be linked to various networks to receive data from other sources that might indicate that the claimant or people linked to the claimant are associated with fraud. Databases having criminal histories, lists of accounts associated with known fraud, driving records, and other sources of relevant data might be analyzed at fraud system 150 and the resulting analysis included in an assignment of a risk score.

The described risk scoring model can also be augmented with other methodologies for assessing risk. For example, a system such as that described in U.S. application Ser. No. 13/410,150, filed Mar. 1, 2012, entitled SYSTEM AND METHOD FOR SUSPECT ENTITY DETECTION AND MITIGATION, by Robin Love et al, which is hereby incorporated by reference, could be employed to further assess risk. Such a system would use a data analysis and linking methodology by creating a network of data nodes or records pertaining to people, businesses, organizations, addresses, telephone numbers and so forth, and then linking a person (such as the claimant) or an account (such as a claimant's account) to one or more of the records. Such a methodology could be employed in a separate system and the results provided to fraud system 150 or, alternatively, the methodology could be implemented within fraud system 150.

Figure 4:
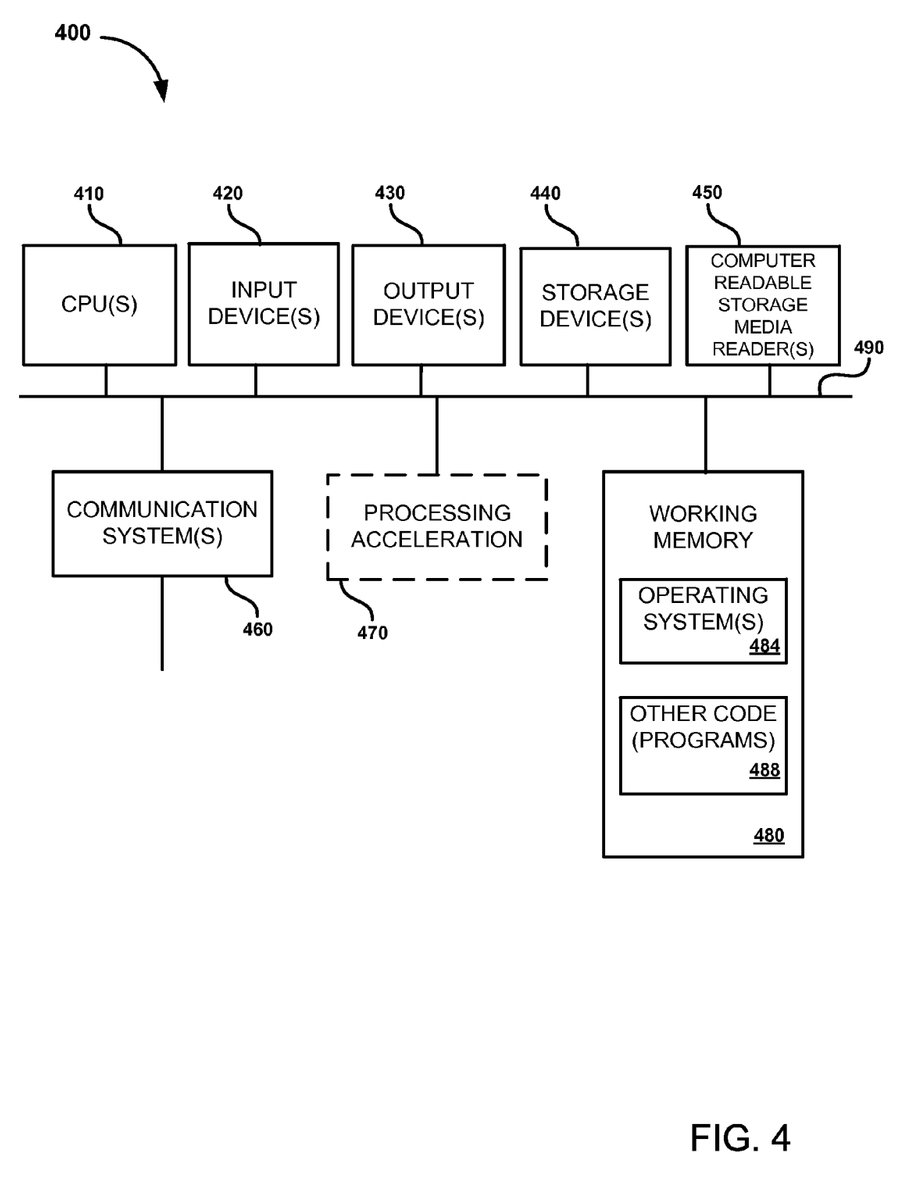
FIG. 4 is a block diagram illustrating an exemplary computer system upon which embodiments of the present invention may be implemented.

FIG. 4 is a block diagram illustrating an exemplary computer system upon which embodiments of the present invention may be implemented. This example illustrates a computer system 400 such as may be used, in whole, in part, or with various modifications, to provide the functions of the central database system 110 and the fraud analysis system 150, as well as other components and functions of the invention described herein.

The computer system 400 is shown comprising hardware elements that may be electrically coupled via a bus 490. The hardware elements may include one or more central processing units 410, one or more input devices 420 (e.g., a mouse, a keyboard, etc.), and one or more output devices 430 (e.g., a display device, a printer, etc.). The computer system 400 may also include one or more storage devices 440, representing remote, local, fixed, and/or removable storage devices and storage media for temporarily and/or more permanently containing computer-readable information, and one or more storage media readers 450 for accessing the storage devices 440. By way of example, storage devices 440 may be disk drives, optical storage devices, solid-state storage device such as a random access memory ("RAM") and/or a read-only memory ("ROM"), which can be programmable, flash-updateable or the like.

The computer system 400 may additionally include a communications system 460 (e.g., a modem, a network card—wireless or wired, an infra-red communication device, a Bluetooth™ device, a near field communications (NFC) device, a cellular communication device, etc.) The communications system 460 may permit data to be exchanged with a network, system, computer, mobile device and/or other component as described earlier. The system 400 also includes working memory 480, which may include RAM and ROM devices as described above. In some embodiments, the computer system 400 may also include a processing acceleration unit 470, which can include a digital signal processor, a special-purpose processor and/or the like.

The computer system 400 may also comprise software elements, shown as being located within a working memory 480, including an operating system 484 and/or other code 488. Software code 488 may be used for implementing functions of various elements of the architecture as described herein. For example, software stored on and/or executed by a computer system, such as system 400, can be used in implementing the process seen in FIG. 3.

It should be appreciated that alternative embodiments of a computer system 400 may have numerous variations from that described above. For example, customized hardware might also be used and/or particular elements might be implemented in hardware, software (including portable software, such as applets), or both. Furthermore, there may be connection to other computing devices such as network input/output and data acquisition devices (not shown).

While various methods and processes described herein may be described with respect to particular structural and/or functional components for ease of description, methods of the invention are not limited to any particular structural and/or functional architecture but instead can be implemented on any suitable hardware, firmware, and/or software configuration. Similarly, while various functionalities are ascribed to certain individual system components, unless the context dictates otherwise, this functionality can be distributed or combined among various other system components in accordance with different embodiments of the invention. As one example, the central account database system 110 and fraud analysis system 150 may be implemented by a single system having one or more storage device and processing elements. As another example, the central account database system 110 and fraud monitoring system 150 may each be implemented by plural systems, with their respective functions distributed across different systems either in one location or across a plurality of linked locations.

Moreover, while the various flows and processes described herein (e.g., those illustrated in FIG. 3) are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments may be described with (or without) certain features for ease of description and to illustrate exemplary features, the various components and/or features described herein with respect to a particular embodiment can be substituted, added, and/or subtracted to provide other embodiments, unless the context dictates otherwise. Further, the term "exemplary" used herein does not mean that the described example is preferred or better than other examples.

Consequently, although the invention has been described with respect to exemplary embodiments, it will be appreciated that the invention is intended to cover all modifications and equivalents within the scope of the following claims.

What is claimed is:

1. A computer-implemented method, comprising:
providing a database;
storing in the database, by one or more processors, account data for accounts maintained at one or more institutions, the account data for each respective account comprising at least a personal identifier associated with a person for whom transactions are posted to that respective account;
receiving, by one or more of the processors, a request to assess risk of transactions at the account affecting the eligibility of the person to receive benefits, the request including a submitted personal identifier;
locating, by one or more of the processors, an account by matching the submitted personal identifier to the personal identifier stored in the database for the located account; and
determining, by one or more of the processors, if any transactions posted to the located account affect the eligibility of the person for receiving benefits, including evaluating transactions posted to the located account to determine the likelihood that a transaction posted to the located account represents employment compensation affecting the eligibility of the person for receiving benefits.

2. The method of claim 1, wherein the benefits are unemployment insurance benefits, and wherein any transactions posted to the located account are deposits that result from employment compensation.

3. The method of claim 2, wherein the accounts comprise accounts maintained at a plurality of financial institutions, and wherein the person having transactions posted to the located account is the account holder of that account.

4. The method of claim 1, wherein the benefits are unemployment insurance benefits, wherein the accounts comprise accounts maintained by one or more of:
a payroll processing service;
a payroll data aggregator;
a payroll payment provider;
a military benefits administrator; and
a taxing authority; and
wherein the submitted personal identifier identifies any transactions posted to the located account that reflect employment income to the person.

5. The method of claim 1, further comprising:
providing a risk score, based on characteristics of transactions posted to the located account, that reflects the likelihood that that account holder is not entitled to receive benefits.

6. The method of claim 1, wherein the step of determining if any posted transactions affect eligibility further comprises the steps of:
reviewing each transaction posted to the located account, and
if the transaction is associated with an automated clearinghouse (ACH) entry, evaluating at least one of an originator field, standard entry class field, and originator entry description field in the ACH entry, to determine if likelihood of a deposit of employment compensation; and
if the transaction is associated with a negotiable instrument, evaluating at least one of a payor name, paid amount and payor account associated with the negotiable instrument, to determine the likelihood of a deposit of employment compensation.

7. The method of claim 1, wherein the step of determining if any posted transactions affect eligibility further comprises the steps of:
reviewing each transaction posted to the located account;
identifying recurring deposits to the located account; and
evaluating the pattern of the recurring deposits to determine the likelihood of a recurring deposit reflecting employment compensation.

8. The method of claim 1, wherein the personal identifier is selected from a group consisting of an account number, a name, an address and a social security number.

9. The method of claim 1, wherein the step of determining if any posted transactions affect eligibility further comprises the steps of:
identifying a period of time during which employment income affects the eligibility of the person for receiving benefits; and
evaluating transactions posted to the located account during the identified period of time to determine the likelihood of a deposit of employment compensation.

10. A system for detecting employment income of an unemployment insurance claimant, comprising:
a database storing account data for at least one account of at least one claimant, including data for transactions posted to the account;
a fraud analysis system for accessing the database, where the fraud analysis system determines the risk, for a period of time associated with a designated unemployment payment period, that a deposit to the account during the designated unemployment payment period is for employment income.

11. The system of claim 10, wherein the database stores account data for accounts of a plurality of account holders maintained at a plurality of financial institutions.

12. The system of claim 11, wherein the fraud analysis system determines the risk that a deposit is for employment income based at least in part on one or more factors selected from a group of factors consisting of:
 (a) the deposit being identified as a payroll deposit;
 (b) the deposit being identified as a recurring deposit;
 (c) the deposit being for an amount similar to past payroll deposits;
 (d) the account being solely owned by the claimant;
 (e) the identity of the payor;
 (f) the account being the account into which unemployment benefits are paid; and
 (g) patterns of deposits in the past to the account.

13. The system of claim 12, wherein the fraud analysis system provides a risk score, based on group of factors, that reflects the likelihood that that a deposit to the account during the designated unemployment payment period is for employment income.

14. The system of claim 10 wherein the fraud analysis system receives a personal identifier associated with the claimant and identifies the account stored in the data base based on the personal identifier.

15. The system of claim 14, wherein the personal identifier is selected from a group consisting of an account number, a name, an address and a social security number.

16. A computer-implemented method, comprising:
 providing a database;
 storing, in the database, by one or more processors, account data for a plurality of accounts maintained at a plurality of institutions, the account data for each respective account comprising at least a personal identifier associated with an account holder of that respective account and transactions posted against that account;
 receiving, by one or more of the processors, a request to assess risk of transactions at the account affecting the eligibility of the account holder for receiving benefits, the request including a submitted personal identifier;
 locating, by one or more of the processors, an account by matching the submitted personal identifier to the personal identifier stored in the database for the located account; and
 identifying, by one or more of the processors, any transactions posted to the located account that could potentially affect the eligibility of the account holder for receiving benefits, including evaluating transactions posted to the located account to determine the likelihood that a transaction posted to the located account represents employment compensation.

17. The method of claim 16, wherein the benefits are unemployment insurance benefits, and wherein any transactions posted to the located account are deposits that result from employment compensation.

18. The method of claim 17, further comprising:
 providing a risk score, based on characteristics of transactions posted to the located account, that reflects the likelihood that that account holder is not entitled to receive benefits.

19. The method of claim 16, wherein the personal identifier is selected from a group consisting of an account number, a name, an address and a social security number.

20. A system, comprising
 a database; and
 at least one processor, the at least one processor programmed to:
 store, in the database, account data for accounts maintained at one or more institutions, the account data for each respective account comprising at least a personal identifier associated with a person for whom transactions are posted to that respective account;
 receive a request to assess risk of transactions at the account affecting the eligibility of the person to receive benefits, the request including a submitted personal identifier;
 locate an account by matching the submitted personal identifier to the personal identifier stored in the database for the located account; and
 determine if any transactions posted to the located account affect the eligibility of the person for receiving benefits, including evaluating transactions posted to the located account to determine the likelihood that a transaction posted to the located account represents employment compensation.

21. The system of claim 20, wherein the benefits are unemployment insurance benefits, and wherein any transactions posted to the located account are deposits that result from employment compensation.

22. The system of claim 21, wherein the accounts comprise accounts maintained at a plurality of financial institutions, and wherein the person having transactions posted to the located account is the account holder of that account.

23. The system of claim 20, wherein the benefits are unemployment insurance benefits, wherein the accounts comprise accounts maintained by one or more of:
 a payroll processing service;
 a payroll data aggregator;
 a payroll payment provider;
 a military benefits administrator; and
 a taxing authority; and
wherein the submitted personal identifier identifies any transactions posted to the located account that reflect employment income to the person.

24. The system of claim 20, wherein the at least one processor is further programmed to:
 provide a risk score, based on characteristics of transactions posted to the located account, that reflects the likelihood that that account holder is not entitled to receive benefits.

25. The system of claim 20, wherein the at least one processor, when determining if any posted transactions affect eligibility, is further programmed to:
 review each transaction posted to the located account, and
 if the transaction is associated with an automated clearinghouse (ACH) entry, evaluate at least one of an originator field, standard entry class field, and originator entry description field in the ACH entry, to determine if the likelihood of a deposit of employment compensation; and
 if the transaction is associated with a negotiable instrument, evaluate at least one of a payor name, paid amount and payor account associated with the negotiable instrument, to determine the likelihood of a deposit of employment compensation.

26. The system of claim 20, wherein the at least one processor, when determining if any posted transactions affect eligibility, is further programmed to:
 review each transaction posted to the located account;
 identify recurring deposits to the located account; and
 evaluate the pattern of the recurring deposits to determine the likelihood of a recurring deposit reflecting employment compensation.

27. The system of claim 20, wherein the personal identifier is selected from a group consisting of an account number, a name, an address and a social security number.

28. The system of claim 20, wherein the at least one processor, when determining if any posted transactions affect eligibility, is further programmed to:
- identify a period of time during which employment income affects the eligibility of the person for receiving benefits; and
- evaluate transactions posted to the located account during the identified period of time to determine the likelihood of a deposit of employment compensation.

29. The method of claim 1, wherein the transaction affecting the eligibility of the person is a deposit of a negotiable instrument.

30. The method of claim 1, wherein the transaction affecting the eligibility of the person is an ACH credit transaction.

* * * * *